United States Patent
Thapliya et al.

(10) Patent No.: US 10,434,656 B2
(45) Date of Patent: Oct. 8, 2019

(54) ROBOT CONTROL SYSTEM

(71) Applicant: FUJI XEROX CO., LTD., Tokyo (JP)

(72) Inventors: Roshan Thapliya, Yokohama (JP);
Belinda Dunstan, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 37 days.

(21) Appl. No.: 15/221,081

(22) Filed: Jul. 27, 2016

(65) Prior Publication Data

US 2017/0266812 A1 Sep. 21, 2017

(30) Foreign Application Priority Data

Mar. 16, 2016 (JP) ................................. 2016-052253

(51) Int. Cl.
 *B25J 11/00* (2006.01)
 *B25J 9/00* (2006.01)
(52) U.S. Cl.
 CPC ......... *B25J 11/0005* (2013.01); *B25J 9/0003* (2013.01); *B25J 11/008* (2013.01)
(58) Field of Classification Search
 USPC .................................................. 700/245–264
 See application file for complete search history.

(56) References Cited

U.S. PATENT DOCUMENTS

| | | | | |
|---|---|---|---|---|
| 5,832,189 A * | 11/1998 | Tow | ........................ | G06N 3/008 700/259 |
| 6,249,780 B1 * | 6/2001 | Mizokawa | ........... | G05B 19/042 706/11 |
| 6,438,454 B1 * | 8/2002 | Kuroki | .................... | B25J 13/003 700/108 |
| 6,629,242 B2 * | 9/2003 | Kamiya | ................. | G06N 3/008 713/100 |
| 6,671,582 B1 * | 12/2003 | Hanley | .................. | A01B 51/02 250/339.11 |
| 6,754,560 B2 * | 6/2004 | Fujita | ..................... | B25J 13/003 318/568.12 |

(Continued)

FOREIGN PATENT DOCUMENTS

| | | |
|---|---|---|
| EP | 2 933 065 A1 | 10/2015 |
| JP | 2005-125466 A | 5/2005 |
| WO | 2015/093382 A1 | 6/2015 |

OTHER PUBLICATIONS

Aug. 4, 2017 Search Report issued in European Patent Application No. 16186790.8.

(Continued)

*Primary Examiner* — Jonathan L Sample
(74) *Attorney, Agent, or Firm* — Oliff PLC

(57) ABSTRACT

A robot control system includes a humanoid conversation robot that has a conversation with a user, at least one service execution robot that provides a service to the user, a recognition unit that recognizes a request and an emotion of the user through the conversation between the user and the humanoid conversation robot, and a determination unit that determines a service which is to be provided to the user and a service execution robot which is to execute the service among the at least one service execution robot according to the request and the emotion of the user. The service execution robot determined by the determination unit executes the determined service.

12 Claims, 14 Drawing Sheets

(56) References Cited

U.S. PATENT DOCUMENTS

| | | | | |
|---|---|---|---|---|
| 6,907,688 B2* | 6/2005 | Brint | A01M 31/06 | 40/417 |
| 7,363,108 B2* | 4/2008 | Noda | G05D 1/0088 | 318/568.12 |
| 7,412,390 B2* | 8/2008 | Kobayashi | G10L 13/02 | 704/258 |
| 7,761,231 B2* | 7/2010 | Kawabe | B25J 19/027 | 318/568.12 |
| 8,090,193 B2* | 1/2012 | Higaki | G06K 9/6857 | 382/103 |
| 8,380,349 B1* | 2/2013 | Hickman | G05D 1/0246 | 700/247 |
| 8,818,556 B2* | 8/2014 | Sanchez | G06N 3/008 | 382/155 |
| 8,880,222 B2* | 11/2014 | Kawamoto | B25J 9/1664 | 318/568.12 |
| 8,996,429 B1* | 3/2015 | Francis, Jr. | G06N 3/008 | 706/12 |
| 9,050,723 B1* | 6/2015 | Elazary | G06F 11/0793 |  |
| 9,302,393 B1* | 4/2016 | Rosen | B25J 9/1694 |  |
| 9,486,921 B1* | 11/2016 | Straszheim | B25J 9/1679 |  |
| 9,776,327 B2* | 10/2017 | Pinter | G06Q 50/22 |  |
| 9,785,911 B2* | 10/2017 | Galluzzo | B25J 5/007 |  |
| 9,821,455 B1* | 11/2017 | Bareddy | B25J 9/0084 |  |
| 9,919,232 B2* | 3/2018 | Tappeiner | A63H 30/04 |  |
| 9,921,574 B1* | 3/2018 | Annan | G05B 19/4155 |  |
| 2001/0001318 A1* | 5/2001 | Kamiya | G06N 3/008 | 700/246 |
| 2002/0013641 A1* | 1/2002 | Nourbakhsh | G05D 1/0214 | 700/245 |
| 2002/0120362 A1* | 8/2002 | Lathan | A63F 13/00 | 700/245 |
| 2002/0140715 A1* | 10/2002 | Smet | G06F 16/957 | 715/700 |
| 2002/0165790 A1* | 11/2002 | Bancroft | G06Q 10/063 | 705/7.29 |
| 2002/0198717 A1* | 12/2002 | Oudeyer | G10L 13/033 | 704/270 |
| 2003/0004611 A1* | 1/2003 | McKinney, Jr. | G06N 3/008 | 700/258 |
| 2003/0019671 A1* | 1/2003 | Inoue | A63H 3/006 | 180/8.1 |
| 2003/0045203 A1* | 3/2003 | Sabe | G06N 3/008 | 446/356 |
| 2003/0055654 A1* | 3/2003 | Oudeyer | G10L 13/033 | 704/275 |
| 2003/0088336 A1* | 5/2003 | Osawa | A63H 3/28 | 700/245 |
| 2003/0109959 A1* | 6/2003 | Tajima | G06N 3/008 | 700/245 |
| 2003/0139849 A1* | 7/2003 | Kuroki | B62D 57/02 | 700/245 |
| 2004/0075677 A1* | 4/2004 | Loyall | G06F 3/011 | 715/706 |
| 2004/0153211 A1* | 8/2004 | Kamoto | A63H 11/00 | 700/245 |
| 2005/0102246 A1* | 5/2005 | Movellan | G06K 9/00248 | 706/12 |
| 2005/0151842 A1* | 7/2005 | Oohashi | G06K 9/00664 | 348/86 |
| 2005/0197739 A1* | 9/2005 | Noda | B25J 11/001 | 700/245 |
| 2005/0216121 A1* | 9/2005 | Sawada | G06N 3/008 | 700/245 |
| 2006/0041332 A1* | 2/2006 | Sabe | G06N 3/008 | 700/245 |
| 2006/0111811 A1* | 5/2006 | Okamoto | B25J 5/007 | 700/214 |
| 2006/0149824 A1* | 7/2006 | Park | H04L 69/26 | 709/206 |
| 2006/0179022 A1* | 8/2006 | Holland | G06N 3/004 | 706/45 |
| 2006/0195598 A1* | 8/2006 | Fujita | H04L 29/06 | 709/230 |
| 2006/0293787 A1* | 12/2006 | Kanda | B25J 9/1671 | 700/245 |
| 2007/0021206 A1* | 1/2007 | Sunnen | A61B 5/165 | 463/36 |
| 2007/0135962 A1* | 6/2007 | Kawabe | G01S 17/74 | 700/225 |
| 2007/0150099 A1* | 6/2007 | Lee | G06N 3/008 | 700/245 |
| 2007/0192910 A1* | 8/2007 | Vu | B25J 5/007 | 700/245 |
| 2007/0222344 A1* | 9/2007 | Kornbluh | A63H 13/00 | 310/311 |
| 2008/0077277 A1* | 3/2008 | Park | G06N 3/008 | 700/245 |
| 2008/0119959 A1* | 5/2008 | Park | G06N 3/008 | 700/245 |
| 2008/0195980 A1* | 8/2008 | Morris | G06F 3/0481 | 715/864 |
| 2008/0221730 A1* | 9/2008 | Sakata | G06N 3/004 | 700/245 |
| 2008/0253613 A1* | 10/2008 | Jones | G06F 3/017 | 382/103 |
| 2009/0002178 A1* | 1/2009 | Guday | A61B 5/0002 | 340/573.1 |
| 2009/0040231 A1* | 2/2009 | Sano | G06T 13/40 | 345/474 |
| 2009/0055019 A1* | 2/2009 | Stiehl | B25J 9/1671 | 700/249 |
| 2009/0265051 A1* | 10/2009 | Shu | B63G 8/14 | 701/21 |
| 2009/0271031 A1* | 10/2009 | Kwon | G06N 3/008 | 700/245 |
| 2009/0319459 A1* | 12/2009 | Breazeal | G06K 9/00335 | 706/46 |
| 2010/0131277 A1* | 5/2010 | Nakano | G10L 15/22 | 704/270 |
| 2010/0153317 A1* | 6/2010 | Lee | B25J 9/1661 | 706/12 |
| 2010/0298976 A1* | 11/2010 | Sugihara | G06N 3/008 | 700/248 |
| 2011/0004577 A1* | 1/2011 | Jung | G06N 3/004 | 706/12 |
| 2011/0018717 A1* | 1/2011 | Takahashi | A01K 11/008 | 340/573.1 |
| 2011/0054691 A1* | 3/2011 | Lee | A01M 29/06 | 700/259 |
| 2011/0183305 A1* | 7/2011 | Orbach | A61B 5/16 | 434/236 |
| 2011/0276396 A1* | 11/2011 | Rathod | G06Q 10/00 | 705/14.49 |
| 2011/0288684 A1* | 11/2011 | Farlow | B25J 11/009 | 700/264 |
| 2012/0022688 A1* | 1/2012 | Wong | G06N 3/008 | 700/253 |
| 2012/0115390 A1* | 5/2012 | Fuchiwaki | A63H 27/008 | 446/35 |
| 2012/0182392 A1* | 7/2012 | Kearns | B25J 11/009 | 348/46 |
| 2012/0185095 A1* | 7/2012 | Rosenstein | B25J 5/007 | 700/259 |
| 2012/0239196 A1* | 9/2012 | Olivier, III | B25J 9/1689 | 700/245 |
| 2013/0022232 A1* | 1/2013 | Jacob | G06K 9/00 | 382/103 |
| 2013/0035790 A1* | 2/2013 | Olivier, III | G05D 1/0246 | 700/246 |
| 2013/0078600 A1* | 3/2013 | Fischer | G09B 19/00 | 434/236 |
| 2013/0154980 A1* | 6/2013 | Byrnes | G06F 3/01 | 345/173 |
| 2013/0158707 A1* | 6/2013 | Lee | G06N 5/02 | 700/246 |
| 2013/0204430 A1* | 8/2013 | Davey | G06F 19/3456 | 700/216 |

(56) References Cited

U.S. PATENT DOCUMENTS

| | | | |
|---|---|---|---|
| 2014/0032466 A1* | 1/2014 | Kaplan | G06N 3/004 706/45 |
| 2014/0099613 A1* | 4/2014 | Krauss | G06N 3/008 434/236 |
| 2014/0129942 A1* | 5/2014 | Rathod | H04N 21/44222 715/720 |
| 2014/0152507 A1* | 6/2014 | McAllister | G06K 7/10376 342/126 |
| 2014/0222206 A1* | 8/2014 | Mead | B25J 9/1697 700/259 |
| 2014/0250200 A1* | 9/2014 | Geurts | G06Q 50/01 709/206 |
| 2014/0316566 A1* | 10/2014 | Mazel | B25J 9/1671 700/250 |
| 2015/0088310 A1* | 3/2015 | Pinter | G06Q 50/22 700/253 |
| 2015/0100157 A1* | 4/2015 | Houssin | G10L 15/1815 700/246 |
| 2015/0120043 A1* | 4/2015 | Howard | G06N 5/04 700/246 |
| 2015/0234398 A1* | 8/2015 | Harris | B25J 5/00 700/250 |
| 2015/0258683 A1* | 9/2015 | Izhikevich | B25J 9/163 700/250 |
| 2015/0278889 A1* | 10/2015 | Qian | G06Q 30/0641 705/26.1 |
| 2015/0290795 A1* | 10/2015 | Oleynik | G05B 19/42 700/257 |
| 2015/0314454 A1* | 11/2015 | Breazeal | B25J 9/0003 700/259 |
| 2015/0367513 A1* | 12/2015 | Gettings | G06Q 10/06 700/248 |
| 2016/0059412 A1* | 3/2016 | Oleynik | B25J 9/163 700/257 |
| 2016/0078366 A1* | 3/2016 | Kaplan | G06N 3/008 706/12 |
| 2016/0114488 A1* | 4/2016 | Mascorro Medina | B25J 9/1697 700/259 |
| 2016/0171303 A1* | 6/2016 | Moore | G06K 9/00671 382/153 |
| 2016/0354165 A1* | 12/2016 | Uenoyama | G06Q 30/04 |
| 2017/0050321 A1* | 2/2017 | Look | G06Q 10/063118 |
| 2017/0080564 A1* | 3/2017 | Dalibard | G06N 3/008 |
| 2017/0100842 A1* | 4/2017 | Le Borgne | B25J 9/1694 |
| 2017/0195486 A1* | 7/2017 | Li | H04M 3/5166 |

OTHER PUBLICATIONS

Zhang et al.; "A Knowledge Model-Based Intelligent Coordinative Platform for Service Robot System;" Proceedings of the 2007 IEEE, International Conference on Robotics and Biomimetics, Dec. 15-18, 2007; pp. 233-238; XP031252808.

Tingting et al; "Study on cooperation between humanoid robot Nao and Barrett WAM;" Proceedings of the 2012 IEEE, International Conference on Robotics and Biomimetics, Dec. 11-14, 2012; pp. 980-983; XP032352907.

Park et al; "A Steward Robot for Human-Friendly Human-Machine Interaction in a Smart House Environment;" IEEE Transaction on Automation Science and Engineering; vol. 5; No. 1; Jan. 2008; pp. 21-25; XP011197543.

* cited by examiner

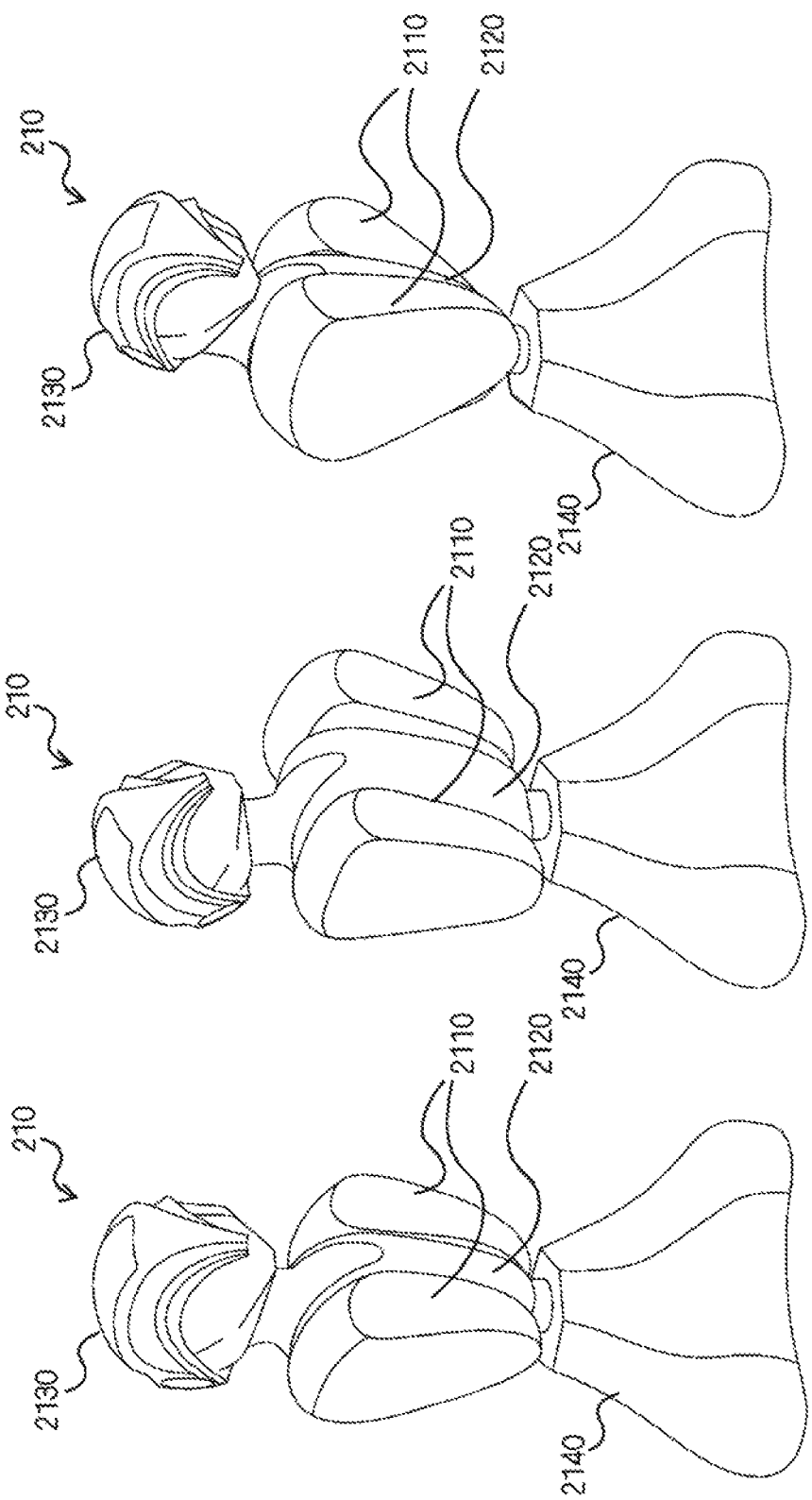

ROBOT CONTROL SYSTEM

CROSS-REFERENCE TO RELATED APPLICATIONS

This application is based on and claims priority under USC 119 from Japanese Patent Application No. 2016-052253 filed on Mar. 16, 2016.

BACKGROUND

Technical Field

The present invention relates to a robot control system.

SUMMARY

According to one aspect of the invention, there is provided a robot control system including: a humanoid conversation robot that has a conversation with a user; at least one service execution robot that provides a service to the user; a recognition unit that recognizes a request and an emotion of the user through the conversation between the user and the humanoid conversation robot; and a determination unit that determines a service which is to be provided to the user and a service execution robot which is to execute the service among the at least one service execution robot according to the request and the emotion of the user. The service execution robot determined by the determination unit executes the determined service.

BRIEF DESCRIPTION OF DRAWINGS

Exemplary embodiments of the present invention will be described in detail based on the following figures, wherein:

FIGS. 9A to 9C are diagrams illustrating an example of a method where the humanoid conversation robot 210 changes a shape of a body according to emotion of a user;

DETAILED DESCRIPTION

Figure 1:
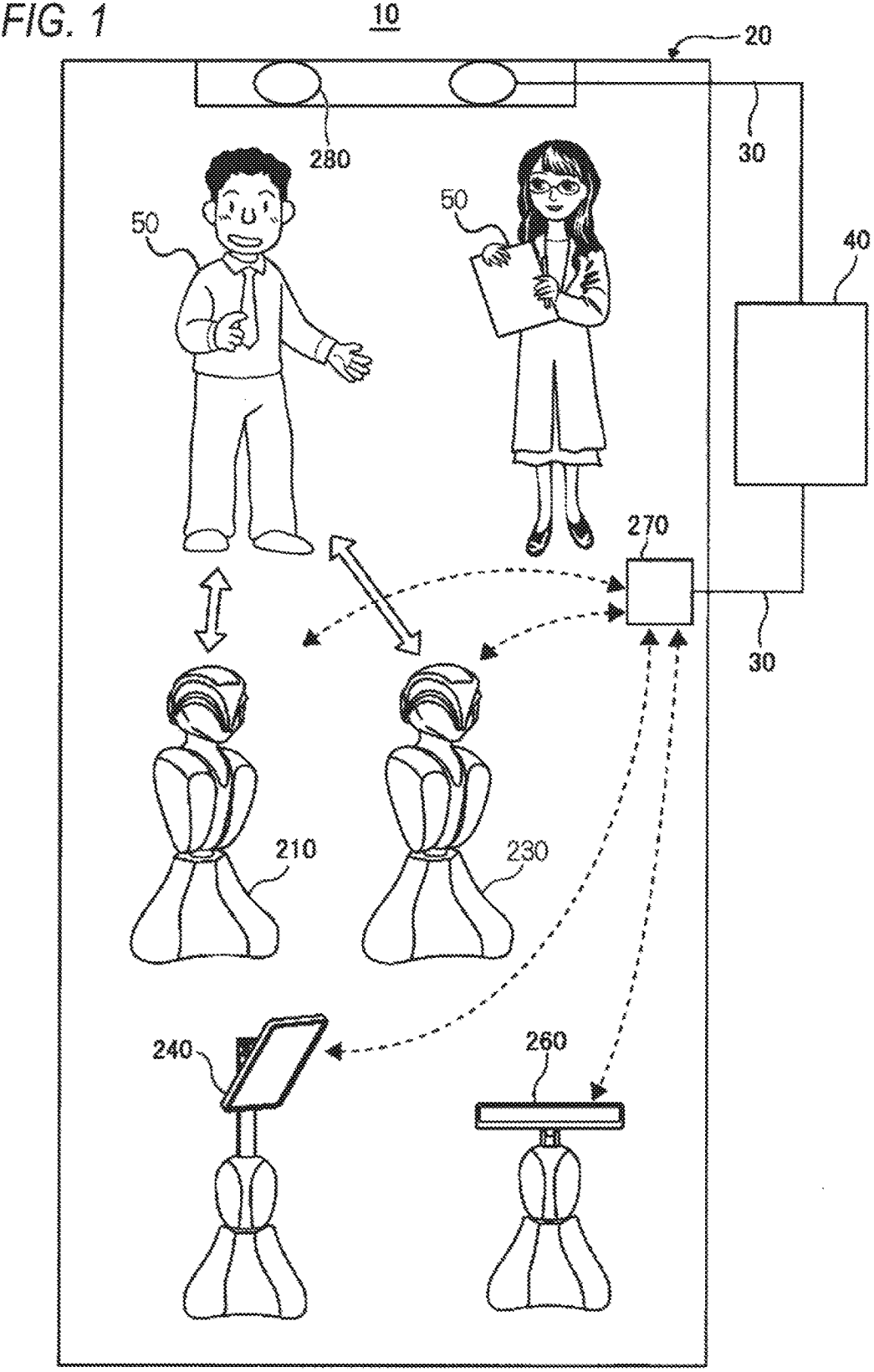
FIG. 1 is an overall schematic diagram illustrating an example of a robot control system 10 according to an exemplary embodiment of the invention.

A robot control system according to an exemplary embodiment of the invention will be described with reference to FIG. 1. A robot control system 10 is arranged in a base point such as an office 20 and is configured to include humanoid conversation robots 210 and 230 which have a conversation with a user 50, service execution robots 240 and 260 which provide services to the user 50, a sensor 280 which is arranged on a ceiling or the like of the office 20, and a server 40. The server 40 is connected to each of the robots 210 to 260 and the sensor 280 via a network 30. The server 40 and each of the robots 210 to 260 are connected to each other and the robots 210 to 260 are connected to each other in a wireless manner through an access point 270 installed in the office 20.

Each of the humanoid conversation robots 210 and 230 has a conversation with the user 50, recognizes request and emotion of the user, and transmits the request and emotion of the user to the server 40. In this exemplary embodiment, a total of two humanoid conversation robots, that is, one humanoid conversation robot 210 and one humanoid conversation robot 230 are arranged in the office 20. In addition, in the invention, only one humanoid conversation robot 210 may be arranged in the office, or three or more humanoid conversation robots may be arranged in the office. In addition, in a case where plural humanoid conversation robots are arranged, the humanoid conversation robots having the same appearance shapes and functions similarly to this exemplary embodiment may be used, or humanoid conversation robots having different appearance shapes and functions may be used.

In addition, each of the service execution robots 240 and 260 is, for example, any one of a transport robot, a table robot, a writing tool providing robot, and an interactive screen robot or a combination of plural robots. In addition, in this exemplary embodiment, one service execution robot 240 is an interactive screen robot, and the other service execution robot 260 is a writing tool providing robot.

The sensor 280 is a three-dimensional motion sensor or the like and is installed on the ceiling, wall, or the like of the office 20. The sensor 280 detects facial expression, behavior, a change of body state, heart rate, body temperature, and the like of the user 50 in the office and outputs the detected information as user information to the server 40 via the network 30.

Figure 2:
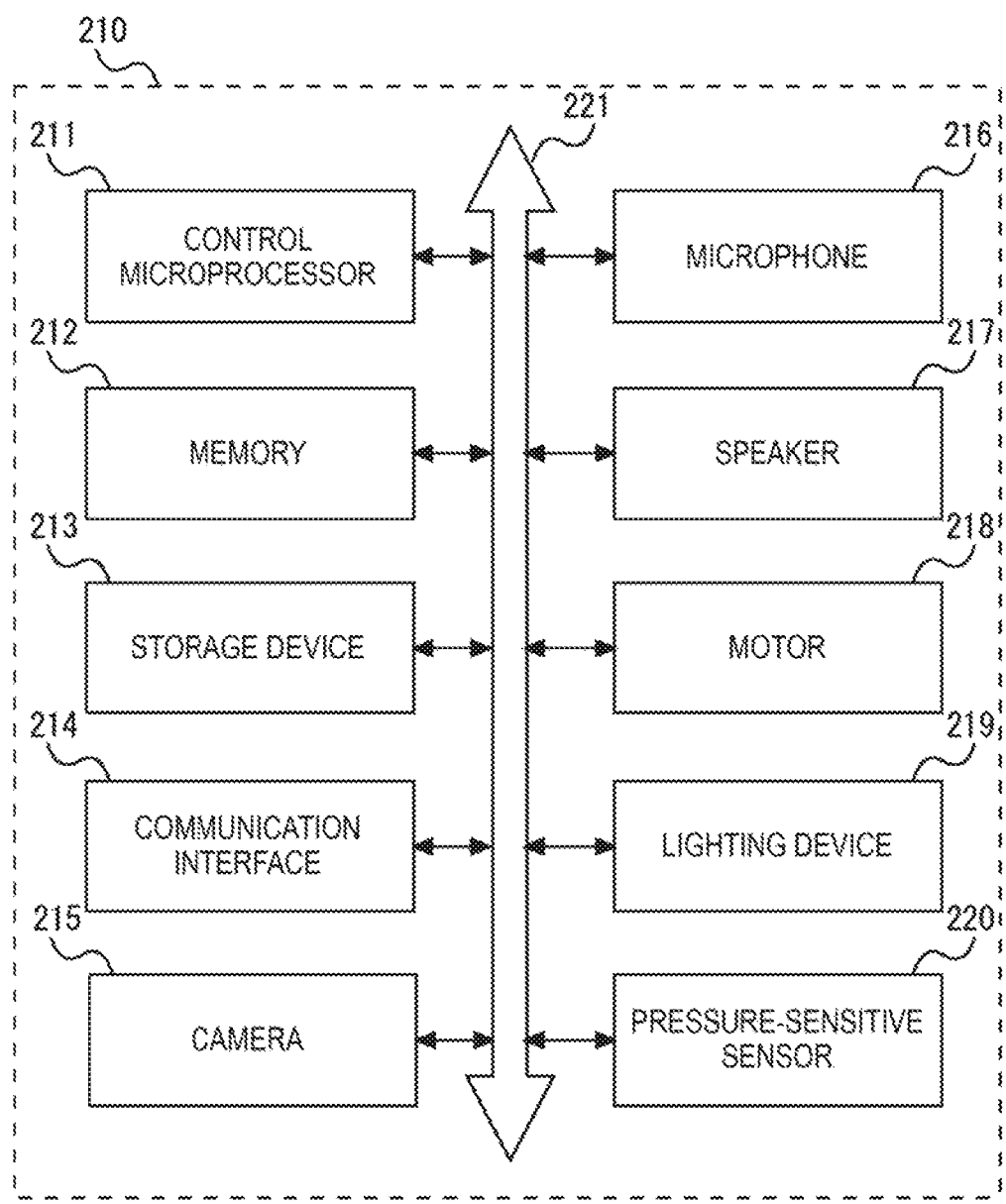
FIG. 2 is a diagram illustrating a hardware configuration of a humanoid conversation robot 210.

Herein, the humanoid conversation robot 210 according to this exemplary embodiment will be described with reference to FIGS. 2 and 3. FIG. 2 is a diagram illustrating a hardware configuration of the humanoid conversation robot 210. As illustrated in FIG. 2, the humanoid conversation robot 210 is configured to include a control microprocessor 211, a memory 212, a storage device 213 such as a hard disk drive (HDD) or a solid state drive (SSD), a communication interface 214, a camera 215, a microphone 216, a speaker 217, a motor 218, a lighting device 219, and a pressure-sensitive sensor 220, and each component is connected to a control bus 221.

The control microprocessor 211 performs overall control over operations of the components of the humanoid conversation robot 210 based on a control program stored in the storage device 213. The memory 212 temporarily stores conversation audios, conversation contents and images of facial expression, behavior, and body state of the user 50 captured by the camera 215, and the like during the conversation between the humanoid conversation robot 210 and the user 50. A control program for controlling each component of the humanoid conversation robot 210 is stored in the storage device 213. The communication interface 214 performs communication control for allowing the humanoid conversation robot 210 to communicate with the server 40, another humanoid conversation robot 230, and the service execution robots 240 and 250 through the access point 270 and the network 30.

The camera 215 images facial expression, behavior, a change in body state, and the like of the user 50 and stores the information in the memory 212. During the conversation with the user 50, the microphone 216 detects an audio of the user 50 and stores the audio in the memory 212, namely, records the audio. Instead of directly recorded audios, contents of conversation obtained by interpreting contents of the audios may be stored in the memory 212. The speaker 217 outputs the audio generated by a conversation control unit, which will be described later, of the humanoid conversation robot 210. The motor 218 moves the chest or head constituting the body of the humanoid conversation robot 210 based on the control information generated in the operation control unit to take specific behavior. As described later, the lighting device 219 is configured with plural LED lights arranged on the head of the humanoid conversation robot 210 and lights in specific colors and specific lighting patterns based on the control information generated in the operation control unit.

The pressure-sensitive sensor 220 is arranged on the head of the humanoid conversation robot 210 and detects whether or not the user 50 touches the humanoid conversation robot 210 or which strength the user touches the humanoid conversation robot with. The pressure-sensitive sensor 220 may be provided to other portions besides the head of the humanoid conversation robot 210. In addition, instead of the pressure-sensitive sensor, a contact sensor may be used to detect heart rate, body temperature, a change in conductivity, or the like of the user 50. The contact sensor may be a wearable sensor attached to the user's body, and in this case, the contact sensor is separated from the humanoid conversation robot 210.

Figure 3:
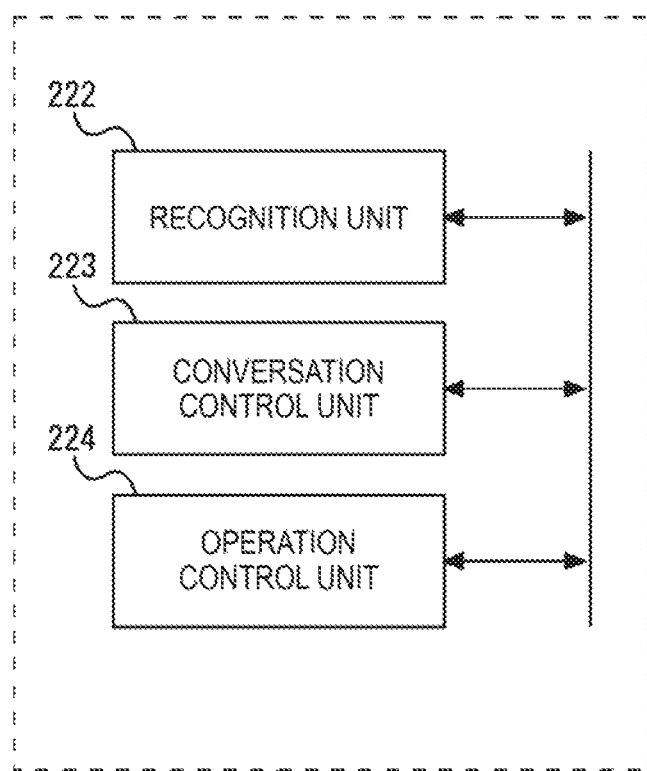
FIG. 3 is a functional block diagram illustrating the humanoid conversation robot 210.

FIG. 3 is a functional block diagram illustrating the humanoid conversation robot 210. The humanoid conversation robot 210 allows the control microprocessor 211 to execute a control program stored in the storage device 213 to function as a recognition unit 222, a conversation control unit 223, and an operation control unit 224 as illustrated in FIG. 3.

The recognition unit 222 recognizes and interprets the request and emotion of the user 50 through a conversation between the user 50 and the humanoid conversation robot 210. More specifically, the recognition unit 222 specifies the request of the user 50 based on the audio data of the user 50 or the conversation contents during the conversation with the user 50 stored in the memory 212. In addition, the recognition unit 222 interprets the emotion of the user 50 based on information configured with any one of behavior, facial expression, complexion, body state, voice tone, speed of words, and heart rate of the user 50 which is stored in the memory 212 or a combination of plural kinds thereof. For example, the change in complexion can be detected from a change in ratios of RGB in the image of the face of the user captured by the camera 215, and the recognition unit 222 calculates a change in heart rate or body temperature of the user based on the change in complexion of the user and interprets the emotion of the user 50 based on the calculation result.

In addition, the recognition unit 222 interprets the audio data of the user 50 which are detected by the microphone 216 and stored in the memory 212 and interprets the emotion of the user 50 based on a voice tone, a speed of voice (speed of words), and the like. With the interpretation of the emotion, for example, "delighted" is interpreted from a change in complexion and a degree of opening state of mouth, "nervous" is interpreted from heart rate and a change in conductivity of skin, and "annoyed" is interpreted from the voice tone and the speed of the words. The recognition unit 222 transmits the information on the interpreted request and emotion to the server 40 through the communication interface 214.

The conversation control unit 223 controls the conversation performed by the humanoid conversation robot 210 with respect to the user 50 and generates contents of response to the user 50. For example, the conversation control unit generates a response message based on the conversation contents stored in the memory 212 and outputs the response message to the speaker 217. At this time, the conversation control unit 223 adjusts a magnitude of the output audio of the message and a speaking speed of the message according to the emotion of the user 50 recognized by the recognition unit 222. The operation control unit 224 generates control information for controlling behavior of the humanoid conversation robot 210 and controls operations of each component constituting the body of the humanoid conversation robot 210. More specifically, the operation control unit generates the control information and controls the operations of the motor 218 to move the chest or head constituting the body of the humanoid conversation robot 210 to take specific behavior or to allow the lighting device 219 to turn on the light in a specific color or a specific lighting pattern.

Since another humanoid conversation robot 230 arranged in the office have the same configuration as that of the above-described humanoid conversation robot 210, the description of the configuration and operations thereof is omitted. The humanoid conversation robot 230 may have a configuration obtained by adding a configuration of a display device such as a liquid crystal display to the configuration of the above-described humanoid conversation robot 210 or may have a configuration obtained by removing the lighting device 219 and the pressure-sensitive sensor 220 from the configuration of the above-described humanoid conversation robot.

Figure 4:
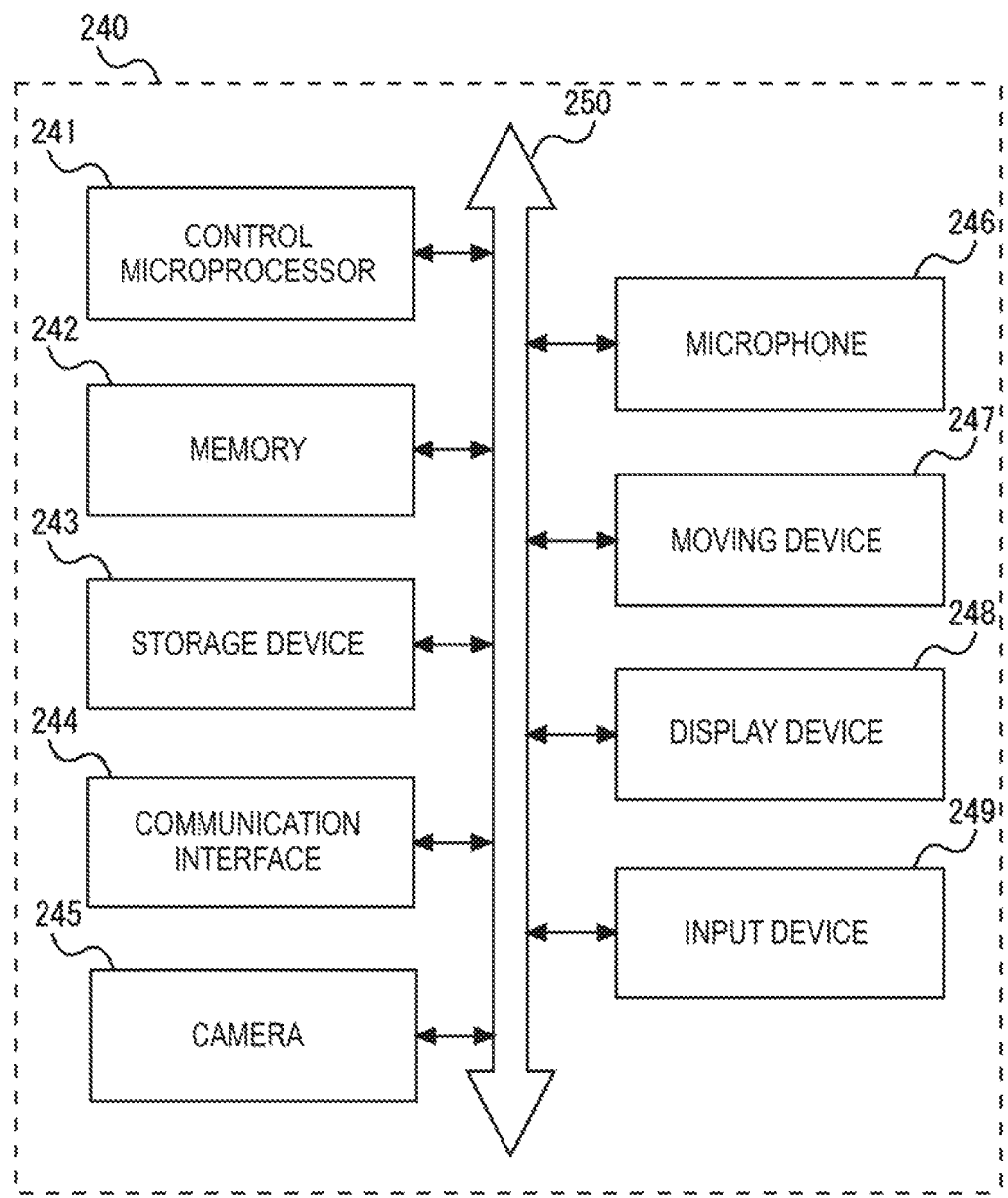
FIG. 4 is a diagram illustrating a hardware configuration of a service execution robot 240.

Next, the service execution robot 240 according to this exemplary embodiment will be described with reference to FIGS. 4 and 5. FIG. 4 is a diagram illustrating a hardware configuration of the service execution robot 240 according to this exemplary embodiment. The service execution robot 240 is configured to a control microprocessor 241, a memory 242, a storage device 243, a communication interface 244, a camera 245, a microphone 246, a moving device 247, a display device 248, and an input device 249, and each component is connected to a control bus 250.

The control microprocessor 241 executes a control program stored in the storage device 243 to perform control over the operations of the components of the service execution robot 240. The memory 242 temporarily stores the service instruction information received from the humanoid conversation robots 210 and 230 through the communication interface 244 or from the server 40. In addition, the memory 242 temporarily stores images captured by the camera 245, audios detected by the microphone 246, or the like. The storage device 243 is a hard disk drive (HDD), a solid state drive (SSD), or the like and stores a control program for controlling the service execution robot 240. The communication interface 244 performs communication control for allowing the service execution robot 240 to communicate with the server 40 or other humanoid conversation robots 210 and 230 through the access point 270 and the network 30.

When the service execution robot 240 moves, the camera 245 images surrounding situations, or in a case where the user 50 stands in front of the display device 248 of the service execution robot 240 and makes a video phone call, the camera images the face of the user 50. Images captured by the camera 245 are temporarily stored in the memory 242. The microphone 246 detects audios and the like of the user 50 and temporarily stores the audios in the memory 242. The moving device 247 is configured to include a driving unit such as wheels and motors necessary for allowing the service execution robot 240 to move to an arbitrary site, a GPS reception unit, and the like. The display device 248 is configured to include a liquid crystal display, an adjusting unit for changing an angle or height of the liquid crystal display, and the like, and the information stored in the storage device 243 or the information acquired from the server 40 or the Internet through the communication interface 244, the access point 270, and the network 30 is displayed on the liquid crystal display. The input device 249 is a touch panel arranged on a surface of a liquid crystal display constituting the display device 248, and necessary information can be input by the user touching a predetermined portion of the touch panel while viewing the information displayed on the display device 248.

Figure 5:
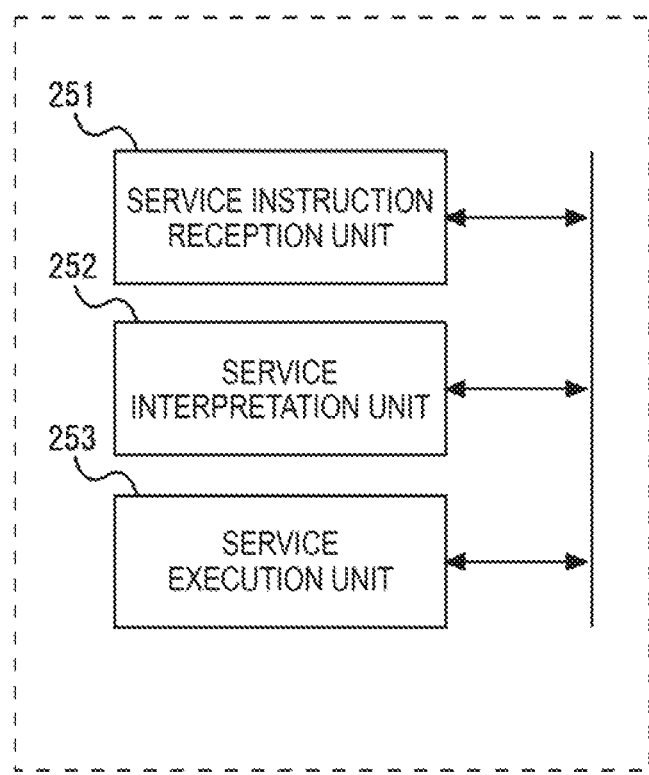
FIG. 5 is a functional block diagram illustrating the service execution robot 240.

FIG. 5 is a functional block diagram illustrating the service execution robot 240. The service execution robot 240 allows the control microprocessor 241 to execute a control program stored in the storage device 243 to function as a service instruction reception unit 251, a service interpretation unit 252, and a service execution unit 253 as illustrated in FIG. 5.

The service instruction reception unit 251 receives the to-be-executed service instruction information from the server 40 and stores the service instruction information in the memory 242. The service instruction information includes information indicating which service is to be executed (service contents), where the service is to provided (service providing site), to whom the service is to be provided (service providing counter party), and when or until when the service is to be provided (service providing time).

The service interpretation unit 252 interprets the received service instruction information and generates specific control information for allowing each component of the service execution robot 240 to operate. The control information includes information on specific operations as to when and how the moving device 247 of the service execution robot 240 is allowed to operate, from where to where the service execution robot 240 is allowed to move, how the display device 248 is allowed to operate, which information is displayed, what is collected and distributed, and how the collected, distributed one is collected and distributed, and the information is temporarily stored in the memory 242.

The service execution unit 253 executes the service received from the server 40 by operating the moving device 247 and the display device 248 according to the control information stored in the memory 242.

The service execution robot 260 has substantially the same configuration as that of the above-described service execution robot 240, and thus, the description thereof is omitted. In addition, the service execution robot may be a transport robot, but in this case, the configuration thereof is obtained by omitting a display device or an input device from the above-described service execution robot 240.

Figure 6:
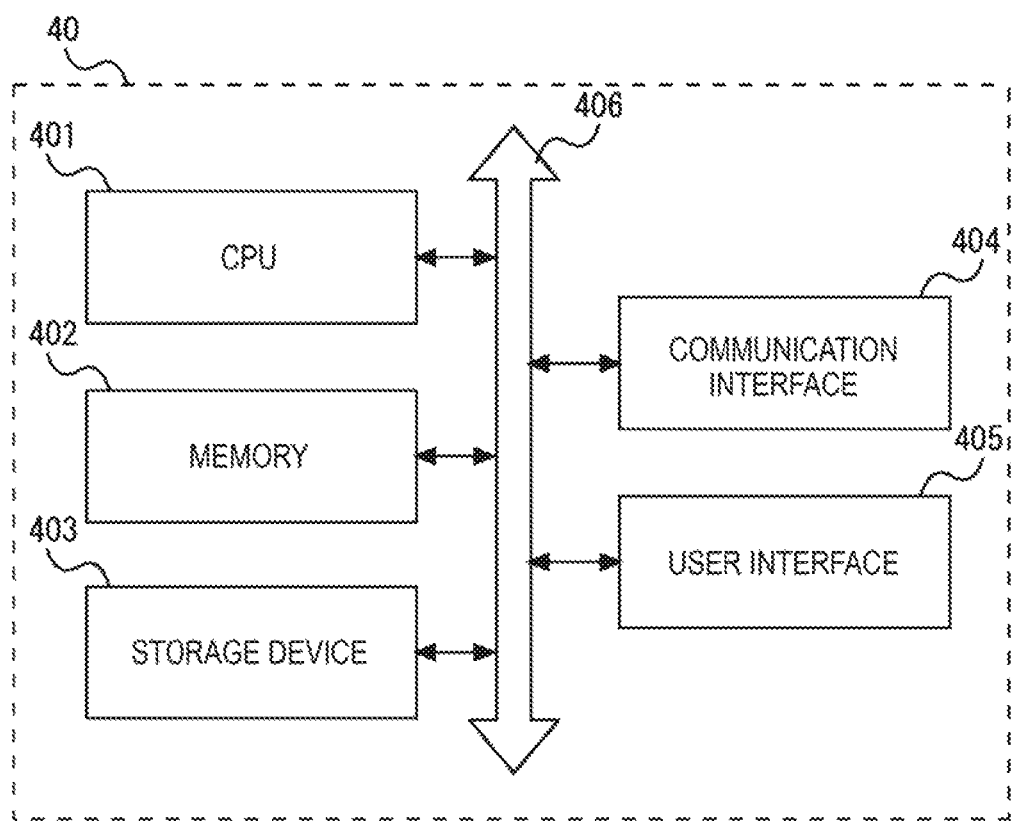
FIG. 6 is a diagram illustrating a hardware configuration of a server 40.

Next, the server 40 according to this exemplary embodiment will be described with reference to FIGS. 6 and 7. FIG. 6 is a diagram illustrating a hardware configuration of the server 40. As illustrated in FIG. 6, the server 40 is configured to include a CPU 401, a memory 402, a storage device 403, a communication interface 404, and a user interface 405, and each component is connected to a control bus 406. The CPU 401 performs overall control over the operations of the components of the server 40 based on a control program stored in the storage device 403. The memory 402 temporarily stores the information on the request and emotion of the user 50 transmitted from the humanoid conversation robots 210 and 230, the user information transmitted from the sensor 280, and the service instruction information transmitted from the service execution robots 240 and 260.

The storage device 403 is a hard disk drive (HDD), a solid state drive (SSD), or the like and stores a control program for controlling the server 40. The communication interface 404 performs communication control for allowing the server 40 to receive/transmit various types of data from/to the humanoid conversation robots 210 and 230, the service execution robots 240 and 260, and the sensor 280 through the access point 270. The user interface 405 is configured with a display device such as a liquid crystal display and an input device such as a keyboard or a mouse so as to allow a manager to adjust the control program stored in the storage device 403.

Figure 7:
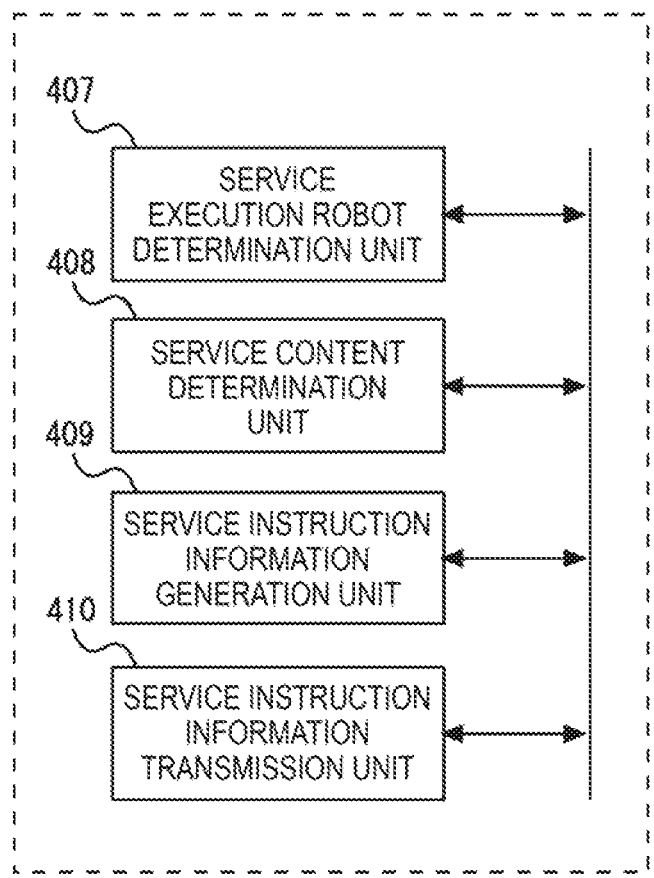
FIG. 7 is a functional block diagram illustrating the server 40.

FIG. 7 is a functional block diagram illustrating the server 40. The server 40 allows the CPU 401 to execute a control program stored in the storage device 403 to function as a service execution robot determination unit 407, a service content determination unit 408, a service instruction information generation unit 409, and a service instruction information transmission unit 410 as illustrated in FIG. 7.

The service execution robot determination unit 407 and the service content determination unit 408 function as determination units which determine a service which is to be provided to the user 50 and a service execution robot which is to actually execute the service according to the request and emotion of the user 50. More specifically, the service execution robot determination unit 407 determines which service execution robot is the best one for service execution based on the information on the request and emotion of the user 50 stored in the memory 402 and the user information received from the sensor 280 and determines the service execution robot which is to actually execute the service. The determination is performed according to a content of the request of the user 50, a type of the service execution robot, and a position of the user 50 or the service execution robot. The service content determination unit 408 determines how which service is executed by the service execution robot determined by the service execution robot determination unit 407 based on the information on the request and emotion of the user 50 stored in the memory 402 and the user information. The service instruction information generation unit 409 generates the service instruction information configured with information such as service contents, a service providing site, a service providing counter party, and a service providing time based on the information determined by the service execution robot determination unit 407 and the service content determination unit 408. The service instruction information transmission unit 410 transmits the service instruction information generated by the service instruction information generation unit 409 to the service execution robot determined by the service execution robot determination unit 407 through the access point 270.

Figure 8:
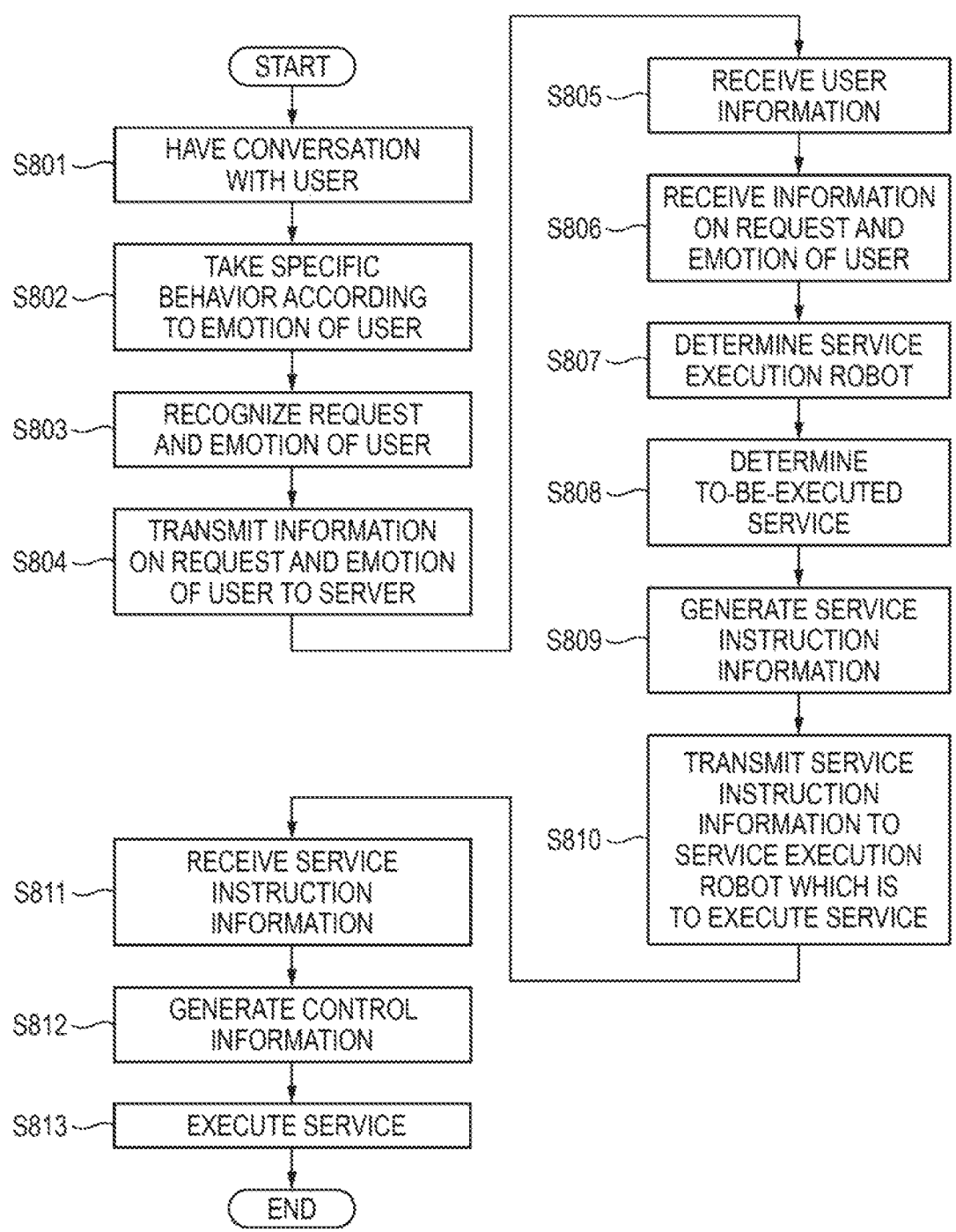
FIG. 8 is a flowchart illustrating a flow of operations of the robot control system 10.

Next, operations of the robot control system 10 according to this exemplary embodiment will be described with reference to FIG. 8. FIG. 8 is a flowchart illustrating a flow of the operations of the robot control system 10. In step S801, the humanoid conversation robot 210 has a conversation with the user 50. In step S802, the humanoid conversation robot 210 further extracts the emotional reaction of the user 50 by changing the shape of the body constituting the humanoid conversation robot 210 or changing the lighting manner of the lighting device 219 according to the emotion of the user 50 under the control of the operation control unit 224. More specifically, as described later, the humanoid conversation robot 210 changes the direction of one or both of the chests and head with respect to the trunk, so that the user 50 is allowed to feel that the humanoid conversation robot 210 expresses specific emotion.

Subsequently, in step S803, the recognition unit 222 of the humanoid conversation robot 210 recognizes the request and emotion of the user 50 through the conversation between the user 50 and the humanoid conversation robot 210. For example, the recognition unit recognizes a request of the user 50 indicating that the user "desires to refer to specific materials" and emotion that "the user 50 is frustrated". In step S804, the recognition unit 222 transmits the information on the request and emotion of the user 50 to the server 40. In the above-described example, the information is information indicating that the user "desires to refer to specific materials" and "the user is frustrated". In addition, at this time, facial expression, behavior, a change in body state, heart rate, body temperature, or the like of the user 50 in the office is detected by the sensor 280 installed in the office 20 and is output as the user information to the server 40 via the network 30.

Subsequently, in step S805, the server 40 receives the user information transmitted from the sensor 280. In addition, in step S806, the server receives the information on the request and emotion of the user 50 transmitted from the humanoid conversation robot 210. In step S807, the service execution robot determination unit 407 of the server 40 determines, according to the user information received from the sensor 280 and the information on the request and emotion of the user 50, which one of the service execution robots is allowed to execute the service. Herein, since the request of the user indicates that the user "desires to refer to specific materials", it is determined that the service execution robot 240 which is an interactive screen robot is to execute the service.

In addition, in step S808, the service content determination unit 408 of the server 40 determines the contents of the service executed by the service execution robot and the service execution manner according to the user information received from the sensor 280 and the information on the request and emotion of the user 50. In the above-described example, the service content indicating that the interactive screen robot 240 is allowed to move closer to the user 50 and to display materials which are desired by the user 50 on the display device 248 is determined. In addition, since the user 50 is frustrated, it is determined that the interactive screen robot is allowed to move more quickly than a normal case (to quickly go to the site of the user 50) and to display the information. Alternatively, in a case where there is another to-be-executed service, the priority of the current service execution may be set to be higher, and the service may be executed in priority to others.

Subsequently, the procedure proceeds to the process of step S809, and the service instruction information generation unit 409 of the server 40 generates the service instruction information configured with a service execution robot executing a service, service content, a service providing site, service-provided counter party, and a service providing time based on the information determined by the service execution robot determination unit 407 and the service content determination unit 408. In step S810, the service instruction information transmission unit 410 of the server 40 transmits the service instruction information generated by the service instruction information generation unit 409 to the service execution robot (for example, the service execution robot 240) determined by the service execution robot determination unit 407.

In step S811, the service instruction reception unit 251 of the service execution robot 240 receives the service instruction information from the server 40. Subsequently, in step S812, the service interpretation unit 252 of the service execution robot 240 interprets the received service instruction information and generates specific control information for operating each component of the service execution robot 240. In step S813, the service execution robot 240 determined by the service execution robot determination unit 407 executes the service determined by the service content determination unit 408. More specifically, the service execution unit 253 of the service execution robot 240 controls the moving device 247, the display device 248, and the like of the service execution robot 240 according to the generated control information to execute the service with respect to the user 50. In the above-described example, the service execution robot 240 moves closer to the user 50, allows the display device 248 which is an interactive screen to be directed toward the user 50, acquires materials which are required by the user 50 from the storage device 243 or from the network through the communication interface 244, and displays the materials on the display device 248.

In addition, in the above-described example, in a case where the user 50 "is frustrated", a case where the service execution robot 240 is allowed to quickly go to the site of the user 50 is described. On the contrary, if the user 50 is not in an imminent state, the moving speed of the service execution robot 240 is set to be lower than a normal case, or in a case where there is another service execution, the priority of the service execution may be set to be lower, and thus, the service execution may be delayed.

In addition, as an example of the above-described operation of the service execution robot 240, another different service is executed according to another request or emotion of the user 50. For example, in a case where the user 50 desires to take a memo, the service execution robot 260 which is a writing tool providing robot may move closer to the user 50, set a writing table which is not only the display device 248 but also the input device 249 in a horizontal direction, and thus, the user 50 may be allowed to write on the writing table. In addition, in a case where the user 50 requires three batteries, a transport robot (not shown) collects three batteries from a predetermined department and transports the batteries to the site of the user 50.

Next, a method where the humanoid conversation robot 210 changes the shape of the body constituting the humanoid conversation robot 210 according to the emotion of the user when the humanoid conversation robot has a conversation with the user 50 will be described with reference to FIGS. 9A to 9C. The humanoid conversation robot 210 is configured to include a body trunk 2120, chests 2110 arranged at the left and right of the body trunk 2120, a head 2130 connected to an upper portion of the body trunk 2120 and arranged above the chests 2110, and a seated portion 2140 connected to a lower portion of the body trunk 2120 and arranged below the chests 2110. The chests 2110 and the head 2130 are movably connected to the body trunk 2120 and are driven by the motor 218. In addition, the humanoid conversation robot 210 has a height ranging from about 110 cm to about 140 cm. In the case of this height, in comparison with a case where the humanoid conversation robot 210 having the same height as the height of an adult is used, the user 50 tends to be less likely to feel a sense of oppression and to be further easy to express emotion.

When the user 50 and the humanoid conversation robot 210 have a conversation with each other, if the user 50 does not express particular emotion, the humanoid conversation robot 210 takes a normal state as illustrated in FIG. 9A. In the normal state, the left and right chests 2110 face each other substantially in parallel in a first distance, that is, a normal width with the body trunk 2120 interposed therebetween. In addition, the head 2130 is directed to the front, and the center of the head 2130 is located just above the body trunk 2120.

If the user 50 seriously talks to the humanoid conversation robot 210 with enthusiasm, the recognition unit 222 of the humanoid conversation robot 210 determines that the user 50 is talking with enthusiasm, and the operation control unit 224 generates control information for allowing the humanoid conversation robot 210 to perform the corresponding expression and controls operations of each component, so that the state of "surprise, interest, curiosity" is taken as illustrated in FIG. 9B. In the state of "surprise, interest, curiosity", the front portions of the left and right chests 2110 are opened to the left and right to be wider than the normal width. In addition, the upper portions of the chests 2110 are opened to the left and right to be wider than the lower portions. In addition, the head 2130 is directed to the slanted upward direction, and the center of the head 2130 is moved backward than the upper portion of the body trunk 2120 is. Therefore, the user 50 determines that the humanoid conversation robot 210 is surprised, is interested, or has a curiosity and has a conversation with greater enthusiasm.

In a case where the user 50 expresses anger during a conversation with the humanoid conversation robot 210, the recognition unit 222 of the humanoid conversation robot 210 determines that the user 50 is angry and takes the state of "sadness, disappointment" through the operation control unit 224 as illustrated in FIG. 9C. In the state of "sadness, disappointment", the front portions of the left and right chests 2110 are closed to be narrower than the normal width. In addition, the upper or lower portions of the chests 2110 are narrower than the lower or upper portions thereof, so that just a shape of "hunching shoulders" is taken. In addition, the head 2130 is directed to the slanted downward direction, and the center of the head 2130 is moved forward than the upper portion of the body trunk 2120 is. Therefore, the user 50 determines that the humanoid conversation robot 210 is disappointed and downhearted and is urged to further express emotion according to the reaction of the humanoid conversation robot 210.

In addition, the above-described method where the humanoid conversation robot changes the shape of the body constituting the humanoid conversation robot 210 according to the emotion of the user is merely one example. Besides, in a case where the user repeats contradictory instructions or wrong instructions, such a body shape representing an overbearing manner or anger by taking such an action as turning the chests may be taken, and a response of "please summarize instruction contents" with an audio louder than a normal audio from the speaker 217 may be taken.

Figure 10B:
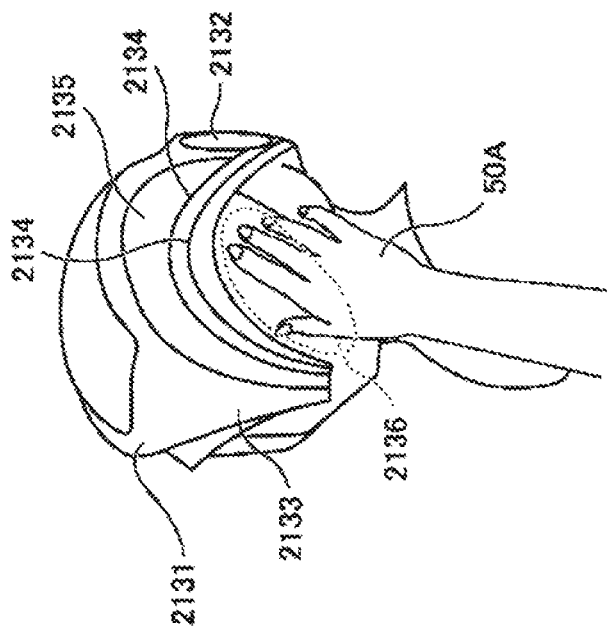
FIG. 10B is a diagram illustrating a state that the user puts a hand on the head of FIG. 10A.
Figure 10A:
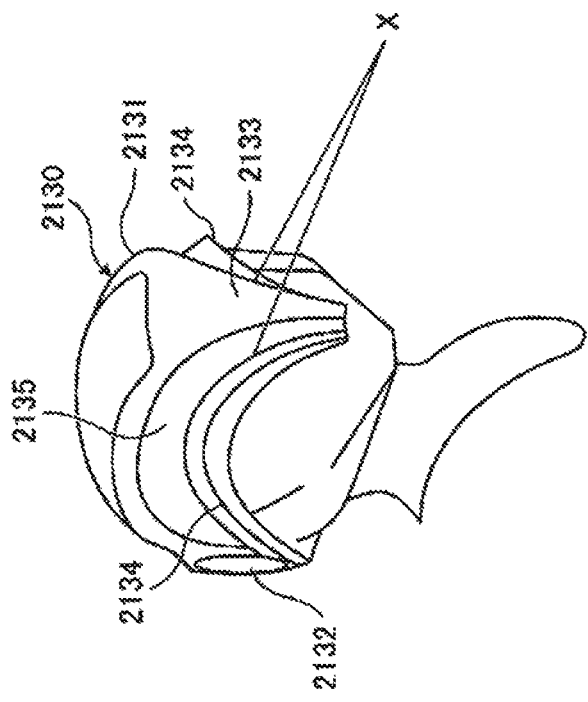
FIG. 10A is a perspective diagram illustrating outer appearance of a head of the humanoid conversation robot 210.

Next, a structure of the head 2130 of the humanoid conversation robot 210 will be described with reference to FIGS. 10A and 10B. FIG. 10A is a perspective diagram illustrating outer appearance of the head of the humanoid conversation robot 210. FIG. 10B is a diagram illustrating a state that the user puts a hand on the head of FIG. 10A. As illustrated in FIG. 10A, elements corresponding to human eyes and mouth in appearance are not provided on the head 2130 of the humanoid conversation robot 210, but one protrusion 2133 is provided. The protrusion 2133 is formed over a range of from the upper portion to the front portion 2131 of the head 2130 to protrude outward than the other portion. Namely, the humanoid conversation robot 210 does not exactly resemble a human, but the humanoid conversation robot has a semi-human appearance shape having only nose and cheeks. In addition, plural-line streaked members 2134 are formed to converge in an arch shape or a streamlined shape to be directed from the rear portion 2132 at the side opposite to the side where the protrusion 2133 is formed toward the protrusion 2133 on the head 2130.

The humanoid conversation robot 210 allows the protrusion 2133 to be directed toward the user 50 at the time of communicating with the user 50. FIG. 10A illustrates a state that the protrusion 2133 is directed toward a point indicated by X. Therefore, the user 50 can easily identify where the humanoid conversation robot 210 is directed toward and who the humanoid conversation robot has a conversation with.

In addition; lighting devices 2135 are arranged to the upper sides of the streaked members 2134 to converge toward the protrusion 2133 along the plural-line streaked members 2134. The lighting device 2135 is configured with, for example, one LED light or plural LED lights. The lighting device 2135 changes the lighting manner according to the emotion of the user 50 recognized by the recognition unit 222. The change of the lighting manner is described later.

In addition, as illustrated in FIG. 10B, a pressure-sensitive sensor 2136 for detecting touch of the user 50 is provided to a region where the protrusion 2133 is not provided, that is, to the lower side of the streaked member 2134 of the head 2130. The pressure-sensitive sensor 2136 may be buried in the skin of the head 2130 so that the pressure-sensitive sensor is not visible from the surface. As illustrated in FIG. 10B, if the user 50 touches the pressure-sensitive sensor 2136 with a hand 50A, presence or absence of touch of the user 50 and a strength of the touch are detected. The presence or absence of the touch or the strength of the touch is transmitted to the recognition unit 222 of the humanoid conversation robot 210 to be used for recognizing the emotion of the user 50.

Figure 11A:
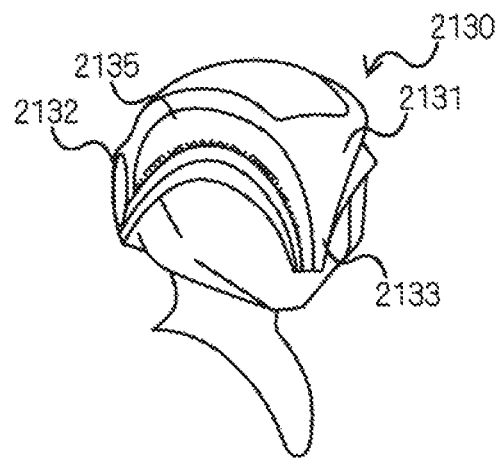
FIGS. 11A to 11C are diagrams illustrating a lighting method of a lighting device at the time of power-on and power-off of the humanoid conversation robot 210.
Figure 11B:
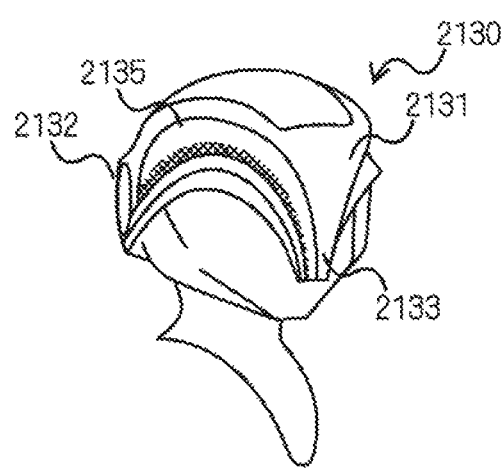
Figure 11C:
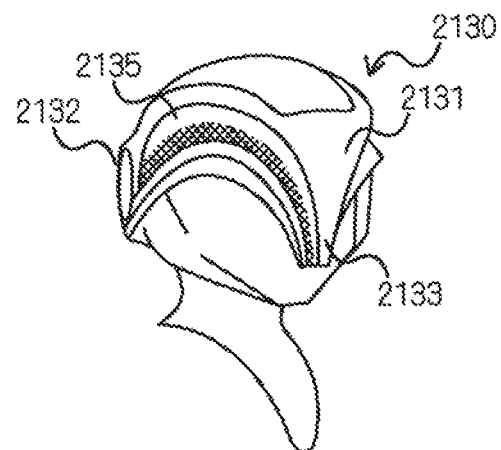
Figure 12A:
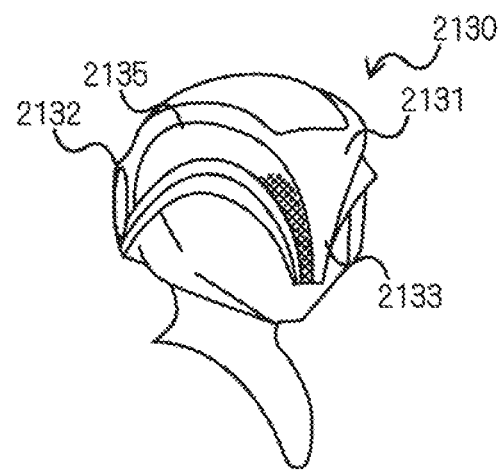
FIGS. 12A to 12C are diagrams illustrating an example of a case where the humanoid conversation robot 210 changes a body shape perceived as emotion of "interest, happiness, curiosity" and changes a lighting method of a lighting device.
Figure 12B:
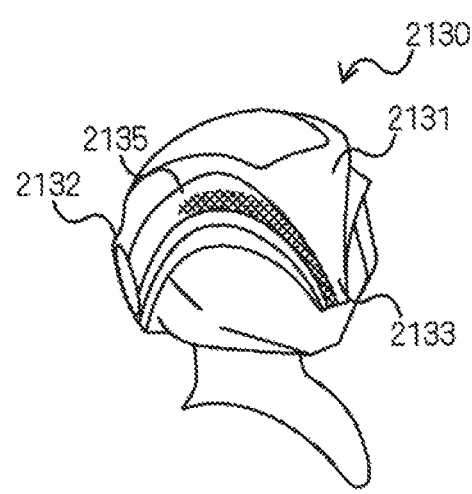
Figure 12C:
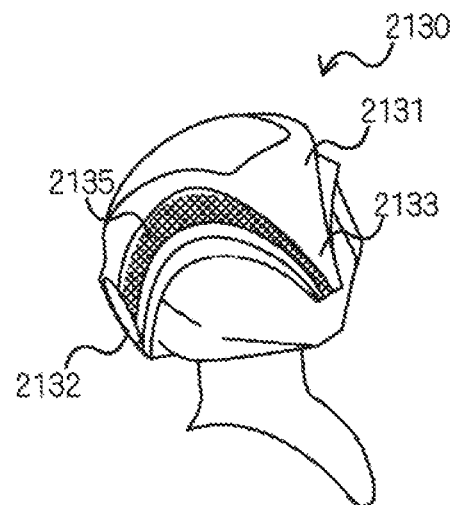
Figure 13A:
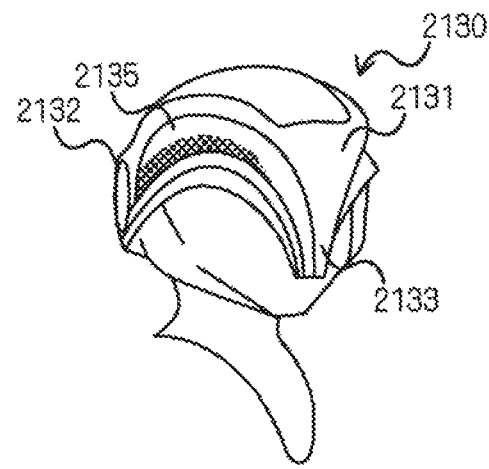
FIGS. 13A to 13C are diagrams illustrating an example of a case where the humanoid conversation robot 210 changes a body shape perceived as emotion of "sadness, embarrassment, disappointment" and changes a lighting method of a lighting device.
Figure 13B:
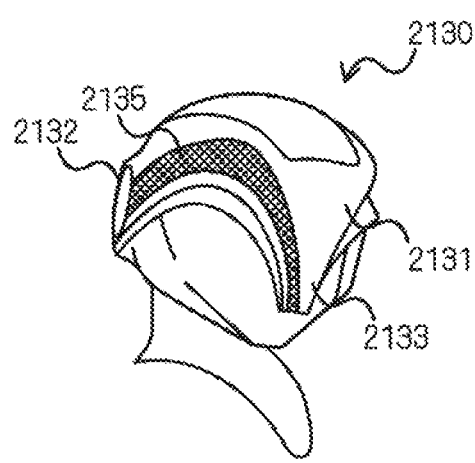
Figure 13C:
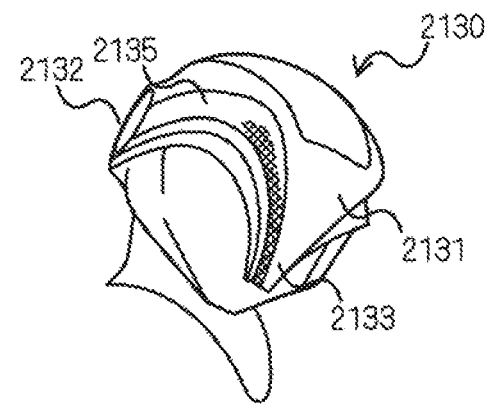

Next, changes of lighting manners of the lighting device 2135 will be described with reference to FIGS. 11A to 13C. FIGS. 11A to 11C are diagrams illustrating a lighting manner of the lighting device 2135 at the time of power-on and power-off of the humanoid conversation robot 210. FIGS. 12A to 12C are diagrams illustrating an example of a case where the humanoid conversation robot 210 changes a body shape perceived as emotion of "interest, happiness, curiosity" and changes the lighting manner of the lighting device 2135. FIGS. 13A to 13C are diagrams illustrating an example of a case where the humanoid conversation robot 210 changes a body shape perceived as emotion of "sadness, embarrassment, disappointment" and changes a lighting manner of the lighting device 2135.

If the humanoid conversation robot 210 is powered on, as sequentially illustrated in FIGS. 11A, 11B, and 11C, the lighting device 2135 is allowed light so that the lighting range is widened as it goes from the streaked member 2134 side toward the upper side. On the contrary, if the humanoid conversation robot is powered off, just before the power-off, as sequentially illustrated in FIGS. 11C, 11B, and 11A, the lighting device is allowed to turn on the light so that the lighting range is decreased as it goes from the upper side toward the streaked member 2134 side, and finally, the lighting device is allowed to entirely turn off the light.

In a case where the humanoid conversation robot 210 allows the lighting device 2135 to turn on the light so that the lighting is perceived as emotion of "interest, happiness, curiosity", as sequentially illustrated in FIGS. 12A, 12B, and 12C, the lighting device 2135 is allowed to turn on the light so that the lighting range is widened backward as it goes from the protrusion 2133 side toward the rear portion 2132. Alternatively, the lighting device may be allowed to turn on the light so that a partial lighting range is moved backward as it goes from the protrusion 2133 side toward the rear portion 2132. In addition, the lighting manner of FIGS. 12A to 12C may be performed once or may be repeatedly performed. Alternatively, the number of times of lighting may be determined according to a strength of the emotion of the user 50. In addition, FIGS. 12A to 12C also illustrate the shape where at the same time of allowing the lighting device 2135 to turn on the light, the head 2130 is directed to the slanted upward direction, and the center of the head 2130 is moved backward than the upper portion of the body trunk 2120 is.

On the other hand, in a case where the humanoid conversation robot 210 allows the lighting device 2135 to turn on the light so that the lighting is perceived as emotion of "sadness, embarrassment, disappointment", as sequentially illustrated in FIGS. 13A, 13B, and 13C, the lighting device 2135 is allowed to turn on the light so that a partial lighting range is moved forward from the rear portion 2132 side toward the protrusion 2133. Alternatively, the lighting device may be allowed to turn on the light so that a lighting range is widened forward as it goes from the rear portion 2132 side toward the protrusion 2133. The lighting manner of FIGS. 13A to 13C may be performed once or may be repeatedly performed. Alternatively, the number of times of lighting may be determined according to a strength of the emotion of the user 50. In addition, FIGS. 13A to 13C also illustrate the shape where at the same time of allowing the lighting device 2135 to turn on the light, the head 2130 is directed to the slanted downward direction, and the center of the head 2130 is moved forward than the upper portion of the trunk is.

In addition, as well as changing of the lighting manner of the lighting device 2135 of the humanoid conversation robot 210, the changing of the color of lighting of the lighting device 2135 may be performed. For example, in the case of the emotion of "interest, happiness, curiosity", the lighting device 2135 is allowed to light in yellow green; and in the case of the emotion of "sadness, embarrassment, disappointment", the lighting device 2135 is allowed to light in purple.

Figure 14:
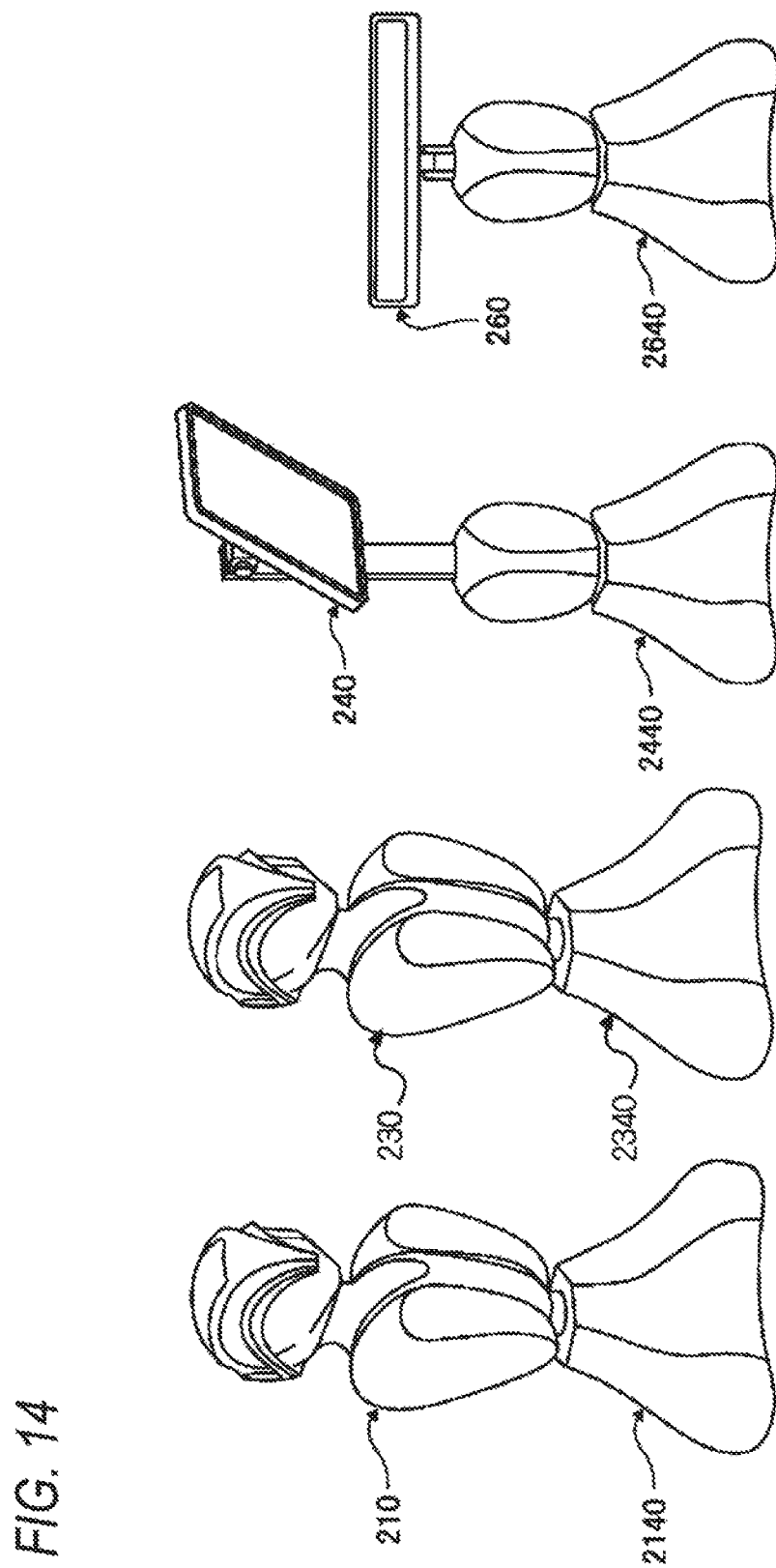
FIG. 14 is a diagram illustrating that humanoid conversation robots 210 and 230 and service execution robots 240 and 260 have seated portions having appearance shapes having a sense of unity.

In addition, in this exemplary embodiment, the humanoid conversation robots 210 and 230 and the service execution robots 240 and 260 have seated portions having appearance configurations providing a sense of unity. An example thereof is illustrated in FIG. 14. In FIG. 14, the seated portion 2140 of the humanoid conversation robot 210, the seated portion 2340 of the humanoid conversation robot 230, and the seated portions 2440 and 2640 of the service execution robots 240 and 260 are frustum-shaped seated portions. The seated portions 2140, 2340, 2440, and 2640 have a circular cone frustum shape, a triangular frustum shape, a rectangular frustum shape, or the like. The seated portions are formed to have the same or similar outer appearance shapes so as to have an appearance configuration providing a sense of unity. In addition, robots arranged at different departments in the office 20 are unified with seated portions having different appearance shapes. Therefore, a team configured with plural robots can be distinguished from another team configured with robots arranged at a different department. In addition, by using the seated portions 2140, 2340, 2440, and 2460, the humanoid conversation robots 210 and 230 and the service execution robots 240 and 260 are stabilized, so that the robots cannot be easily fallen down.

Heretofore, the robot control system 10 according to this exemplary embodiment was described. In addition, in the above-described robot control system 10, a case where the recognition unit 222 recognizing the request and emotion of the user 50 is built in the humanoid conversation robot 210 is described. However, the invention is not limited to the above-described embodiment, but the recognition unit 222 may be arranged to be separated from the humanoid conversation robot 210. For example, the recognition unit may also be allowed to operate as a function of the server 40. In this case, the information configured with any one of conversation contents, behavior, facial expression, complexion, body state, voice tone, speed of words, and heart rate of the user 50 or a combination of plural kinds thereof is received from the humanoid conversation robots 210 and 230 and the sensor 280, and the request and emotion of the user 50 are recognized based on the information. In addition, the recognition units 222 may be installed in both of the humanoid conversation robot 210 and the server 40.

In addition, the humanoid conversation robot 210 is defined as a first humanoid conversation robot, and the humanoid conversation robot 230 is defined as a second humanoid conversation robot. In a case where the first humanoid conversation robot 210 recognizes first request and emotion of the user 50, and after that, the second humanoid conversation robot 230 recognizes second request and emotion of the user 50, the second humanoid conversation robot 230 transmits next request and emotion of the user to the server 40, and the service execution robot determination unit 407 and the service content determination unit 408 of the server 40 determines the service execution robot which is to actually execute a service and contents of the to-be-executed service according to the first request and emotion and the second request and emotion of the user 50.

In addition, in the above-described exemplary embodiment, a case where the service execution robots 240 and 260 complete the service execution is described. However, actually, there is also a case where the service execution is not completed because of falling-down of the service execution robot 240 or 260 on the way, disconnection of charging, or no collection material being found. In this case, the service execution robot 240 transmits a message indicating that the service execution is impossible to the server 40 or the humanoid conversation robots 210 and 230. The service execution robot determination unit 407 and the service content determination unit 408 of the server 40 and the corresponding functions of the humanoid conversation robots 210 and 230 determine whether different service execution robots are instructed to execute the same service in this situation, whether the service is completely stopped, or whether the situation is informed to the user 50 to receive instruction and transmit necessary operation instruction to the humanoid conversation robots 210 and 230 and the service execution robots 240 and 260.

In addition, in the above-described exemplary embodiment, a case where each of the humanoid conversation robots 210 and 230 and the service execution robots 240 and 260 communicates with other robots through the access point 270 and the server 40 is described. However, the invention is not limited to the above-described exemplary embodiment, but the humanoid conversation robots 210 and 230 may be connected to each other not through the access point 270 in a wireless manner to perform direct communication, or the humanoid conversation robot 210 and the service execution robots 240 and 260 may be connected to each other not through the access point in a wireless manner to perform direct communication. Similarly, the humanoid conversation robot 230 and the service execution robots 240 and 260 may be connected to each other in a wireless manner to perform direct communication.

In addition, in the above-described exemplary embodiment, in the server 40, a service execution robot which is to execute a service and contents of the to-be-executed service are determined, and service instruction information is generated based on the contents of the determination. However, these operations may be performed by not the server 40 but the humanoid conversation robots 210 and 230. In this case, the functions corresponding to the service execution robot determination unit 407, the service content determination unit 408, and the service instruction information generation unit 409 are executed by the humanoid conversation robots 210 and 230.

In addition, in the above-described exemplary embodiment, the table robot, the writing tool providing robot, and the interactive screen robot are described as different service providing robots. However, the invention is not limited to the above-described embodiment, but these service providing robots may be integrated. For example, by changing the orientation of a display portion attached with a touch panel which is a display device as well as an input device, for example, the robot may be allowed to function as a display device, a writing table, or a projector.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A robot control system comprising:
a recognition unit that recognizes a request and an emotion of a user through the conversation between the user and a humanoid conversation robot; and
a determination unit that determines an execution manner of service which is provided to the user and a service execution robot which executes the service among a plurality of service execution robots according to a priority based on the recognized request and the recognized emotion.

2. The robot control system according to claim 1, wherein the humanoid conversation robot changes a shape of a body of the humanoid conversation robot according to the emotion of the user recognized by the recognition unit.

3. The robot control system according to claim 2, wherein the humanoid conversation robot changes the shape of the body of the humanoid conversation robot by changing orientation of any one or both of a chest and a head of the humanoid conversation robot with respect to a body trunk of the humanoid conversation robot.

4. The robot control system according to claim 1, wherein the humanoid conversation robot has a protrusion provided on a head of the humanoid conversation robot, and
during the conversation with the user, the protrusion is directed toward the user.

5. The robot control system according to claim 4, wherein the humanoid conversation robot comprises a lighting device on the head, the lighting device being arranged such that the lighting device converges toward the protrusion, and
a lighting manner of the lighting device is changed according to the emotion of the user recognized by the recognition unit.

6. The robot control system according to claim 4, wherein elements corresponding to human eyes and mouth are not provided on the head of the humanoid conversation robot, a pressure-sensitive sensor for detecting touch of the user is provided in a region where the protrusion is not provided.

7. The robot control system according to claim 1, wherein the plurality of service execution robots includes at least one or a combination of a transport robot, a table robot, a writing tool providing robot, and an interactive screen robot.

8. The robot control system according to claim 1, wherein the plurality of service execution robots and the humanoid conversation robot have seated portions appearance configurations of which provide a sense of unity.

9. The robot control system according to claim 1, wherein the recognition unit is provided in the humanoid conversation robot, separately from the humanoid conversation robot, or both in the humanoid conversation robot and separately from the humanoid conversation robot.

10. The robot control system according to claim 1, wherein
a first humanoid conversation robot and a second humanoid conversation robot are included, and
in a case where the first humanoid conversation robot recognizes a first request and a first emotion of the user and, after that, the second humanoid conversation robot recognizes a second request and a second emotion of the user, the second humanoid conversation robot transmits the second request and the second emotion to the determination unit, and the determination unit determines the to-be-executed service and the service execution robot according to the first request and the first emotion and the second request and the second emotion.

11. The robot control system according to claim 1, further comprising an instruction unit that makes an instruction about the execution manner of service determined by the determination unit to the service execution robot,
   wherein the humanoid conversation robot comprises the determination unit and the instruction unit.

12. The robot control system according to claim 1, wherein the determination unit determines that the service execution robot is allowed to execute the service to the user in a quicker manner than a usual manner in accordance with the emotion of the user.

* * * * *